United States Patent
Hariu et al.

(10) Patent No.: US 12,090,846 B2
(45) Date of Patent: Sep. 17, 2024

(54) ACCELERATOR DEVICE

(71) Applicant: DENSO CORPORATION, Kariya (JP)

(72) Inventors: Tetsuo Hariu, Kariya (JP); Kiyoshi Kimura, Kariya (JP); Takehiro Saitoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/941,468

(22) Filed: Sep. 9, 2022

(65) Prior Publication Data
US 2023/0001788 A1 Jan. 5, 2023

Related U.S. Application Data

(63) Continuation of application No. PCT/JP2021/009746, filed on Mar. 11, 2021.

(30) Foreign Application Priority Data

Mar. 13, 2020 (JP) .................. 2020-044688

(51) Int. Cl.
B60K 26/02 (2006.01)
(52) U.S. Cl.
CPC ...... B60K 26/021 (2013.01); *B60K 2026/023* (2013.01); *B60K 2026/026* (2013.01)

(58) Field of Classification Search
CPC .................. B60K 2026/023; B60K 2026/026
See application file for complete search history.

(56) References Cited

U.S. PATENT DOCUMENTS

| 2016/0251018 | A1 | 9/2016 | Schnieders et al. |
| 2018/0105038 | A1* | 4/2018 | Viethen ................ B60K 26/021 |
| 2019/0310678 | A1 | 10/2019 | Wojciechowski et al. |
| 2020/0039350 | A1 | 2/2020 | Tayama |

FOREIGN PATENT DOCUMENTS

DE 102014118573 6/2016

* cited by examiner

*Primary Examiner* — Vicky A Johnson
(74) *Attorney, Agent, or Firm* — Nixon & Vanderhye P.C.

(57) ABSTRACT

An accelerator device includes an inner housing, a pedal lever, an urging member, and an actuator. The inner housing is supported to the outer housing by a support member. The pedal lever is rotatably supported to the inner housing in response to a stepping operation. The urging member urges the pedal lever in a closing direction. The actuator can drive the inner housing in an opening and closing directions of the pedal lever.

6 Claims, 14 Drawing Sheets

ACCELERATOR DEVICE

CROSS REFERENCE TO RELATED APPLICATIONS

This application is a continuation application of International Patent Application No. PCT/JP2021/009746 filed on Mar. 11, 2021, which designated the U.S. and based on and claims the benefits of priority of Japanese Patent Application No. 2020-044688 filed on Mar. 13, 2020. The entire disclosure of all of the above applications is incorporated herein by reference.

TECHNICAL FIELD

The present disclosure relates to an accelerator device.

BACKGROUND

Conventionally, an accelerator pedal module including an actuator is known.

SUMMARY

An object of the present disclosure is to provide an accelerator device capable of adjusting a reaction force of a pedal lever and storing at least a part of components of the accelerator device such as in autonomous driving.

An accelerator device includes an inner housing, a pedal lever, an urging member, and an actuator. The inner housing is supported to the outer housing by a support member. The pedal lever is rotatably supported to the inner housing in response to a stepping operation. One end of the urging member abuts on the inner housing and the other end abuts on the pedal lever to urge the pedal lever in a closing direction. The actuator drives the inner housing in an opening direction and the closing direction of the pedal lever.

BRIEF DESCRIPTION OF DRAWINGS

The above and other objects, features and advantages of the present disclosure will become more apparent from the following detailed description taken in conjunction with the accompanying drawings. In the drawings.

DETAILED DESCRIPTION

In assumable example, an accelerator pedal module including an actuator is known. For example, an actuator driven by a solenoid engages with a rotating member and applies a force in a return direction.

The accelerator pedal module has the rotating member driven by the actuator, and a physique thereof becomes large. Further, for example, when it is not necessary to operate the accelerator pedal such as in autonomous driving, it is conceivable to store the accelerator device under a vehicle floor in order to flatten the vehicle floor. However, if an actuator for storing the accelerator device is provided separately, the physique of the accelerator device will further increase. An object of the present disclosure is to provide an accelerator device capable of adjusting a reaction force of a pedal lever and storing at least a part of components of the accelerator device such as in autonomous driving.

An accelerator device includes an inner housing, a pedal lever, an urging member, and an actuator. The inner housing is supported to the outer housing by a support member. The pedal lever is rotatably supported to the inner housing in response to a stepping operation. One end of the urging member abuts on the inner housing and the other end abuts on the pedal lever to urge the pedal lever in a closing direction. The actuator drives the inner housing in an opening direction and the closing direction of the pedal lever. As a result, a reaction force of the pedal lever can be adjusted, and at least a part of the components can be stored in the outer housing during autonomous driving or the like.

First Embodiment

Hereinafter, an accelerator device according to the present disclosure will be described with reference to the drawings.

Figure 1:
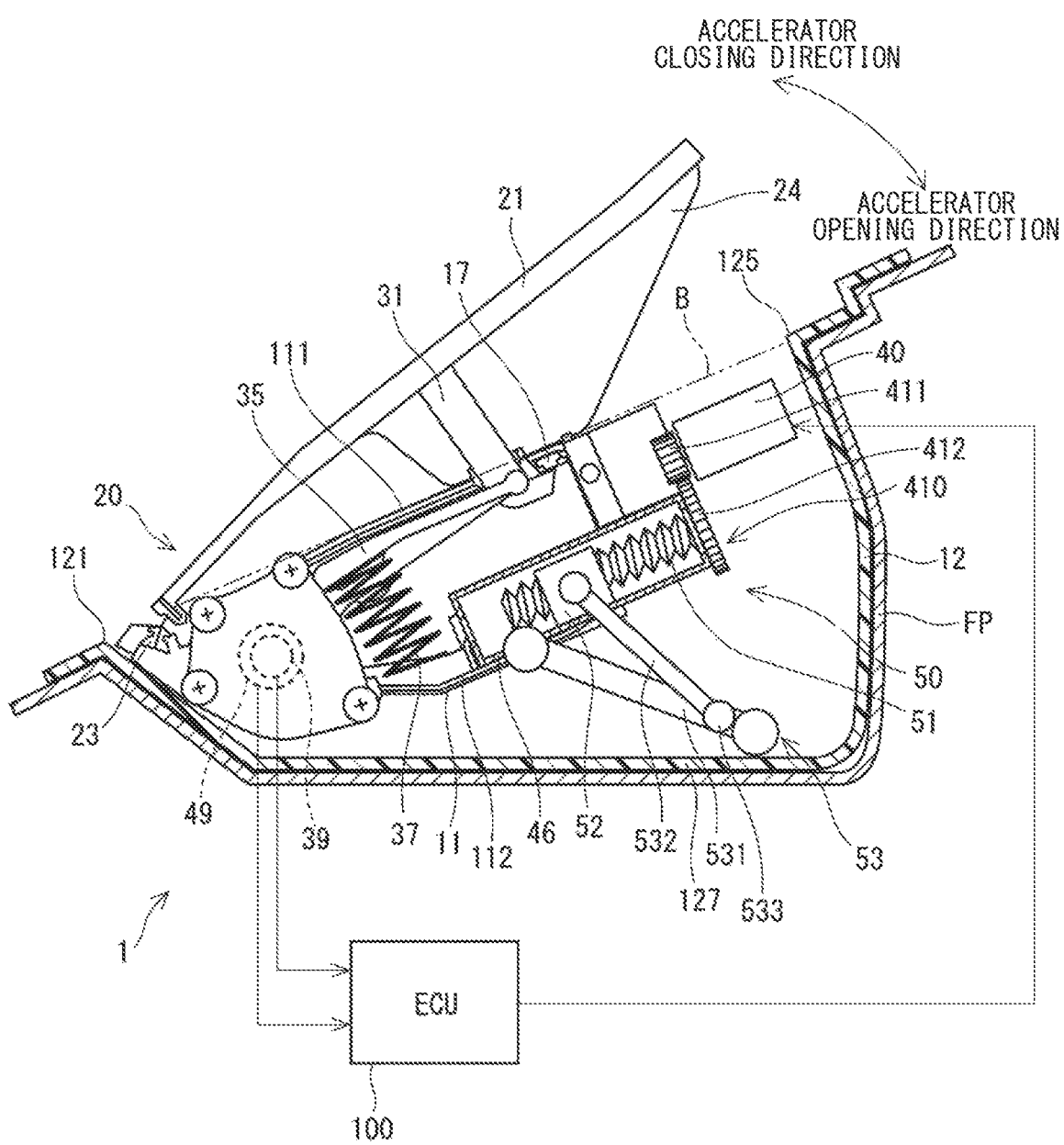
FIG. 1 is a side view showing an accelerator device according to a first embodiment.

Hereinafter, in a plurality of embodiments, a substantially equivalent configuration will be denoted by an identical reference, and explanation thereof will be omitted. A first embodiment is shown in FIGS. 1 to 6. As shown in FIG. 1, an accelerator device 1 includes an inner housing 11, an outer housing 12, a pedal lever 20, a motor 40 as an actuator, a power transmission mechanism 50, and the like. FIG. 1 and the like show a state in which a cover (not shown) provided on a front side of the paper surface of the inner housing 11 is removed, and hatching is described in the parts that become the cross section on the cover surface side.

The inner housing 11 houses an internal movable mechanism such as a pedal 35 inside. The inner housing 11 is attached to the outer housing 12 and can be driven with respect to the outer housing 12 by driving the motor 40. The outer housing 12 is fixed to a floor panel FP that constitutes a part of a vehicle body.

The pedal lever 20 includes a pad 21, an arm 31, and a pedal 35, and is integrally driven by a driver's step-on operation or the like. The pad 21 is provided to be operable by a driver's step-on operation. The pad 21 is rotatably supported to the inner housing 11 by a fulcrum member 23 provided on the inner housing 11. The pedal lever 20 of the present embodiment is a so-called "floor-placing type" in which the pad 21 is provided so as to extend in a direction along one surface of the inner housing 11. A wall portion of the inner housing 11 facing the pad 21 is referred to as a top wall 111, and a wall portion of the inner housing 11 facing the top wall 111 is referred to as a bottom wall 112. A side guard 24 is a member provided in a gap between the pad 21 and the inner housing 11 so that the driver's foot is not interposed between the pad 21 and the inner housing 11.

The arm 31 couples between the pad 21 and the pedal 35. The top wall 111 of the inner housing 11 is formed with an opening through which the arm 31 is inserted. The opening through which the arm 31 is inserted is formed so as not to interfere with the arm 31 in the entire range of pedal operation.

The pedal 35 is housed in the internal space of the inner housing 11 and is rotatably supported to the inner housing 11. One end of the pedal 35 engages the arm 31. With this arrangement, the pad 21, the arm 31, and the pedal 35 are integrally driven by an operation of the pad 21 by the driver.

A pedal urging member 37 is a compression coil spring, one end of which is fixed to the pedal 35 and the other end of which is fixed to the bottom wall 112 to bias the pedal 35 toward the top wall 111. When the pad 21 is not stepped by the driver, the arm 31 comes into contact with a fully closed stopper 17 formed inside the top wall 111. Further, when the driver steps on the pad 21, the pad 21 comes into contact with a fully open stopper (not shown) formed on an outside of the top wall 111. Hereinafter, the state in which the arm 31 is in contact with the fully closed stopper 17 is referred to as a "accelerator fully closed state", and the state in which the pad 21 is in contact with the fully open stopper is referred to as a "accelerator fully open state".

An accelerator opening sensor 39 generates an accelerator opening signal according to a rotation angle of the pedal 35. The accelerator opening sensor 39 has a detection circuit including, for example, a Hall element that detects the direction of a permanent magnet embedded in a shaft portion (not shown) of the pedal 35. As the accelerator opening sensor 39, any sensor other than the Hall element may be used as long as it can detect the accelerator opening. The accelerator opening signal is output to an ECU 100 via a connector (not shown).

The motor 40 is, for example, a DC brushless motor, and is provided so as to be accommodated in the outer housing 12 together with the inner housing 11 and the like. The ECU 100 controls the drive of the motor 40 based on the detection values of an accelerator opening sensor 39 and a housing position sensor 49. The driving force of the motor 40 is transmitted to the outer housing 12 via a power transmission mechanism 50. As a result, the inner housing 11 is driven by the driving force of the motor 40.

Since the accelerator device 1 of the present embodiment is provided with the power transmission mechanism 50, the accelerator device 1 is configured to be able to actively drive the inner housing 11 in an accelerator closing direction (hereinafter referred to as "returning direction") and in an accelerator opening direction (hereinafter referred to as "stepping direction") by the driving force of the motor 40. The accelerator opening sensor 39, the housing position sensor 49 described later, the ECU 100, and the accelerator opening/closing direction are not shown except in FIG. 1.

The power transmission mechanism 50 includes a feed screw 51, a female screw block 52, a link mechanism 53, and the like. The feed screw 51 is housed in a case 46. The case 46 is formed in a substantially cylindrical shape and is fixed to the inner housing 11. The feed screw 51 is a male screw and is rotationally driven by the motor 40 via a gear mechanism 410. The gear mechanism 410 has a first gear 411 and a second gear 412. The first gear 411 rotates integrally with the motor 40, and the second gear 412 that meshes with the first gear 411 rotates integrally with the feed screw 51. As a result, the feed screw 51 is driven by the motor 40.

The female screw block 52 is formed in a rectangular shape in a plan view, and a female thread that meshes with the feed screw 51 is formed inside. The female screw block 52 moves in an axial direction of the feed screw 51 due to the rotation of the feed screw 51. The feed screw 51 side may be a female thread and the screw block side may be a male thread. The male and female threads according to the embodiments described later may also be replaced.

The link mechanism 53 includes a housing connecting member 531, a link 532, and a joint 533. One end of the housing connecting member 531 is rotatably connected to the inner housing 11, and the other end thereof is slidably connected to the outer housing 12. One end of the link 532 is connected to the female screw block 52, and the other end thereof is connected to the housing connecting member 531 via the joint 533. The joint 533 rotatably connects the housing connecting member 531 and the link 532. As a result, the inner housing 11 is rotatably supported with respect to the outer housing 12 by driving the motor 40.

In the present embodiment, the housing position sensor 49 that detects an angle of the inclination of the inner housing 11 with respect to the outer housing 12 is provided. Hereinafter, the angle of the pedal lever 20 with respect to the inner housing 11 detected by the accelerator opening sensor 39 is defined as a pedal angle 61, and the angle of the inner housing 11 with respect to the outer housing 12 defined by the accelerator opening sensor 39 is defined as a housing angle θ2. Further, the angle formed by a reference position B and a tread surface position Ta is defined as a tread surface angle θd. The tread surface angle θd can be regarded as a pedal angle seen from the driver, and if the tread surface position Ta is constant, the tread surface angle θd is constant regardless of the housing angle θ2.

FIG. 1 shows an initial state when the accelerator is fully closed. In the initial state, the top wall 111 of the inner housing 11 and an open end portion 121 of the outer housing 12 are located on substantially the same straight line. In the present embodiment, an end face position on the pad 21 side of the inner housing 11 is set as a reference position B, and is indicated by a two-dot chain line. Further, the pedal angle θ1 indicates the stepping direction as positive, and the housing angle θ2 indicates the returning direction as positive.

In the initial state, the female screw block 52 is located at an initial position where it can move in both directions. The length of the feed screw 51 and the initial position of the female screw block 52 are set according to a drive region of the inner housing 11. The same is applicable to other embodiments described later.

Figure 2:
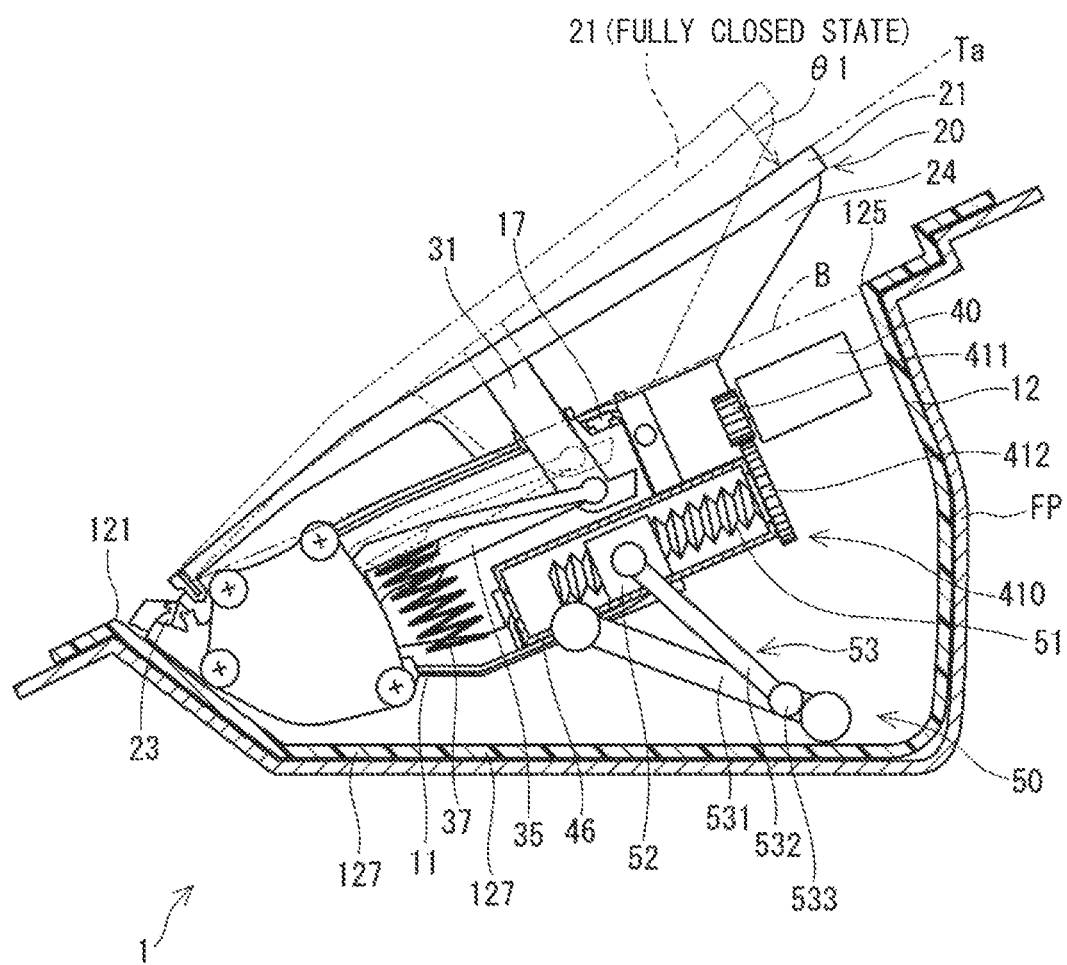
FIG. 2 is a side view showing an accelerator device in a state where a pedal lever is stepped according to the first embodiment.

As shown in FIG. 2, when the pad 21 is stepped, the pedal angle θ1 becomes a value corresponding to an applied brake pedal force. When the pad 21 is stepped, the pedal angle θ1 is expressed as a. Further, since the inner housing 11 is not driven, the housing angle θ2 becomes 0.

Figure 3:
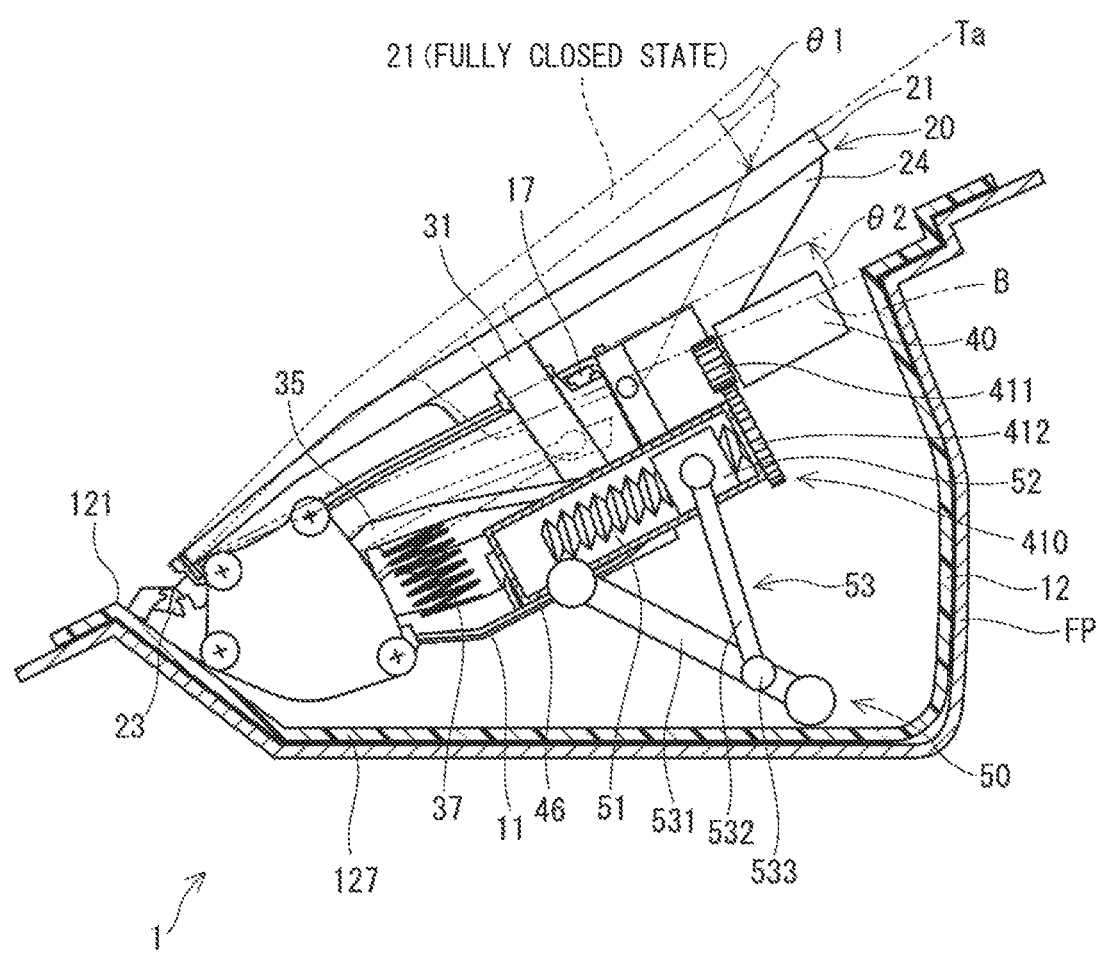
FIG. 3 is a side view showing an accelerator device in a state where an inner housing is driven according to the first embodiment.

As shown in FIG. 3, when the motor 40 is driven in the direction in which the female screw block 52 approaches the gear mechanism 410 side while the tread surface position Ta is maintained, the inner housing 11 is driven to the side closer to the pad 21. At this time, the housing angle θ2 is expressed as 3.

Figure 4A:
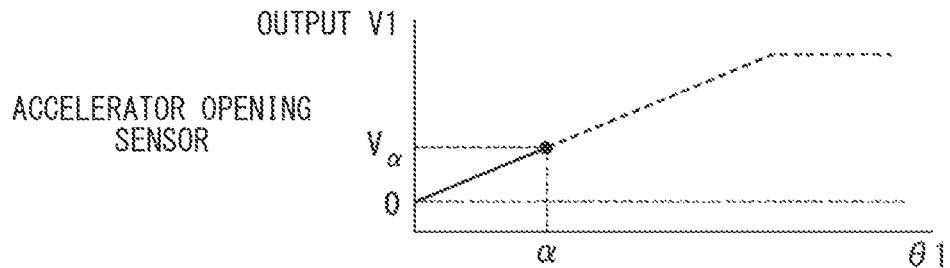
FIG. 4A is a diagram showing an output of an accelerator opening sensor at an initial position of the inner housing according to the first embodiment.
Figure 4B:
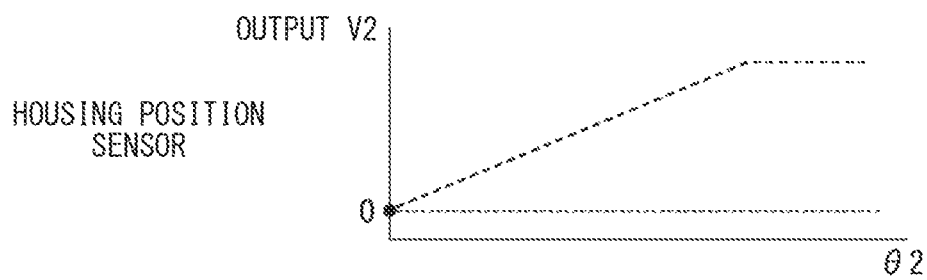
FIG. 4B is a diagram showing an output of a housing position sensor at the initial position of the inner housing according to the first embodiment.
Figure 4C:
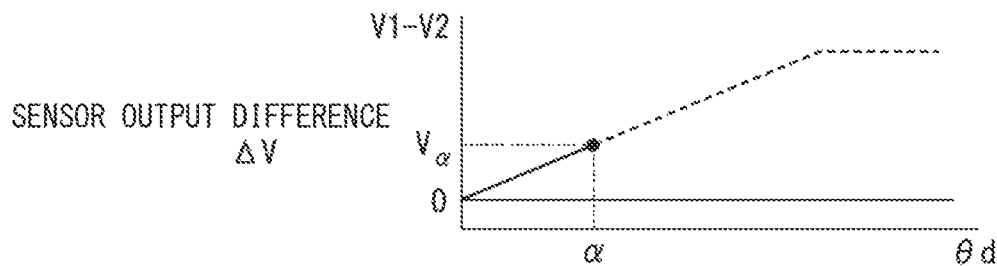
FIG. 4C is a diagram showing a sensor output difference position of the inner housing according to the first embodiment.
Figure 4D:
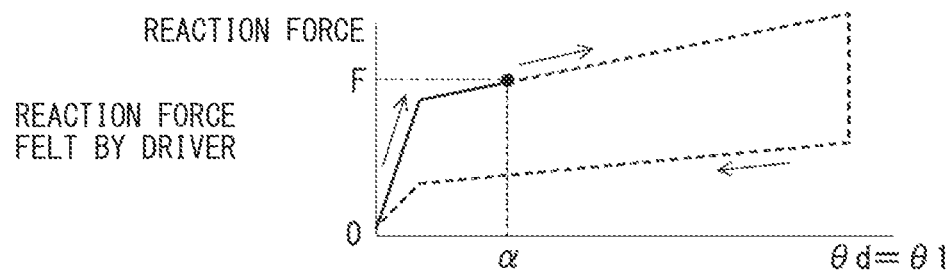
FIG. 4D is a diagram showing a reaction force felt by a driver at the initial position of the inner housing according to the first embodiment.
Figure 5A:
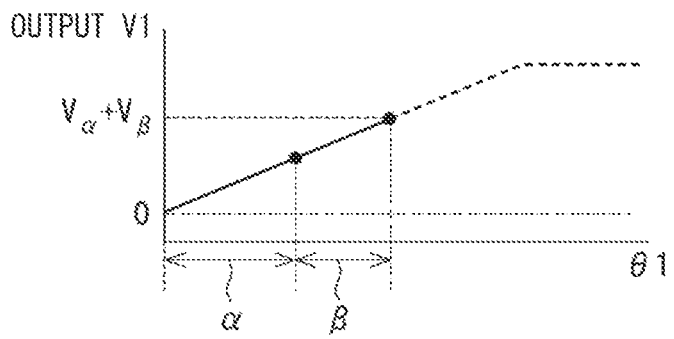
FIG. 5A is a diagram showing an output of an accelerator opening sensor in a state where the inner housing is driven according to the first embodiment.
Figure 5B:
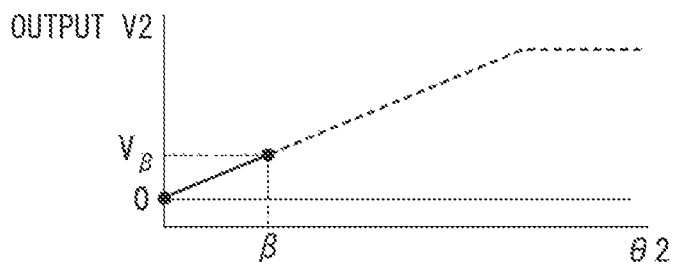
FIG. 5B is a diagram showing an output of a housing position sensor in a state where the inner housing is driven according to the first embodiment.
Figure 5C:
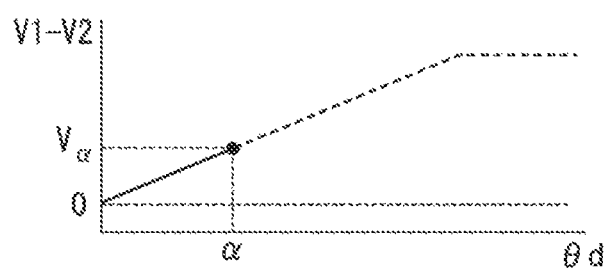
FIG. 5C is a diagram showing a sensor output difference in a state where the inner housing is driven according to the first embodiment.
Figure 5D:
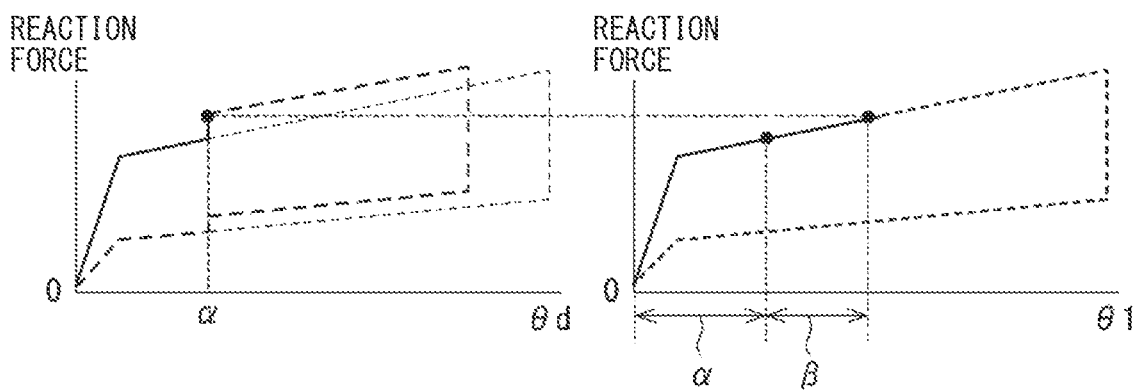
FIG. 5D is a diagram showing a reaction force felt by a driver in a state where the inner housing is driven according to the first embodiment.

The relationships between the angles θ1, θ2, and θd and the reaction force are shown in FIGS. 4A to 4D and FIGS. 5A to 5D. FIGS. 4A and 5A show the output V1 of the accelerator opening sensor 39, FIGS. 4B and 5B show the output V2 of the housing position sensor 49, FIGS. 4C and 5C show a sensor output difference ΔV=V1−V2, and FIGS. 4D and 5D show the reaction force felt by the driver. In FIGS. 4A and 5A, the horizontal axis represents the angle θ1 and the vertical axis represents the sensor voltage V1, in FIGS. 4B and 5B, the horizontal axis represents the angle θ2 and the vertical axis represents the sensor output V2. In FIGS. 4C and 5C, the horizontal axis represents the tread surface angle θd, and the vertical axis represents the sensor output difference ΔV. In FIGS. 5D and 5D, the horizontal axis represents the angle and the vertical axis represents the reaction force. Further, FIG. 5D shows the relationship between the tread surface angle θd and the reaction force on the left side of the paper surface, and the relationship between the pedal angle θ1 and the reaction force on the right side of the paper surface.

The case where the inner housing 11 is in the initial position (see FIG. 2) is shown in FIGS. 4A to 4D. As shown in FIG. 4A, the output V1 of the accelerator opening sensor 39 has a value Vα corresponding to the pedal angle θ1. Further, as shown in FIG. 4B, since the inner housing 11 is in the initial position, the output V2 of the housing position sensor 49 becomes 0(zero). Further, as shown in FIG. 4C, the sensor output difference ΔV becomes Vα, and the pedal angle θ1 and the tread surface angle θd match. That is, the pedal angle θ1 and the tread surface angle θd are equal and α(θ1=θd=α). Further, as shown in FIG. 4D, the reaction force by the pedal urging member 37 acts to increase when the pedal lever 20 is stepped, and acts to decrease when the pedal lever 20 is returned. A hysteresis loop is drawn so that the reaction force with respect to the angle θ1 is different between the stepping operation and the returning operation.

FIGS. 5A to 5D show the case where the inner housing 11 is driven from the initial position (see FIG. 3) while the tread surface position Ta is maintained. As shown in FIG. 5B, when the housing angle θ2 is β, the output V2 of the housing position sensor 59 is Vβ. At this time, since the tread surface position Ta is maintained, the tread surface angle θd is a. On the other hand, as shown in FIG. 5A, the pedal angle θ1 is α+β(θ1=α+β), and the output V1 of the accelerator opening sensor 39 is Vα+Vβ(V1=Vα+Vβ). As shown on the right side of the paper in FIG. 5D, the reaction force due to the urging force of the pedal urging member 37 becomes a value corresponding to the pedal angle θ1 (θ1=α+β). Therefore, as shown on the left side of the paper surface in FIG. 5D, the hysteresis loop is closer to the left side of the paper surface so that the reaction force with respect to the tread surface angle θd becomes larger according to the housing angle θ2 as compared with the case where the inner housing 11 is in the initial position. As a result, the driver feels that the reaction force has increased, although the tread surface position Ta does not change. The upper limit of the reaction force applied to the pedal lever 20 is defined by the urging force of the pedal urging member 37.

The output V1 corresponding to the pedal angle θ1 and the output V2 corresponding to the housing angle θ2 are output to the ECU 100. In the ECU 100, the tread surface angle θd can be calculated by calculating the sensor output difference ΔV (see FIG. 5C). Therefore, in the ECU 100, the tread surface angle θd can be used for various operations such as engine control. In other words, in the present embodiment, the tread surface angle θd can be calculated by providing the housing position sensor 49 in addition to the accelerator opening sensor 39. In the examples of FIGS. 4A to 4D and FIGS. 5A to 5D, it is described that the slopes of the outputs V1 and V2 are the same with respect to the angles θ1 and θ2, but if they are different, they may be appropriately converted.

Figure 6:
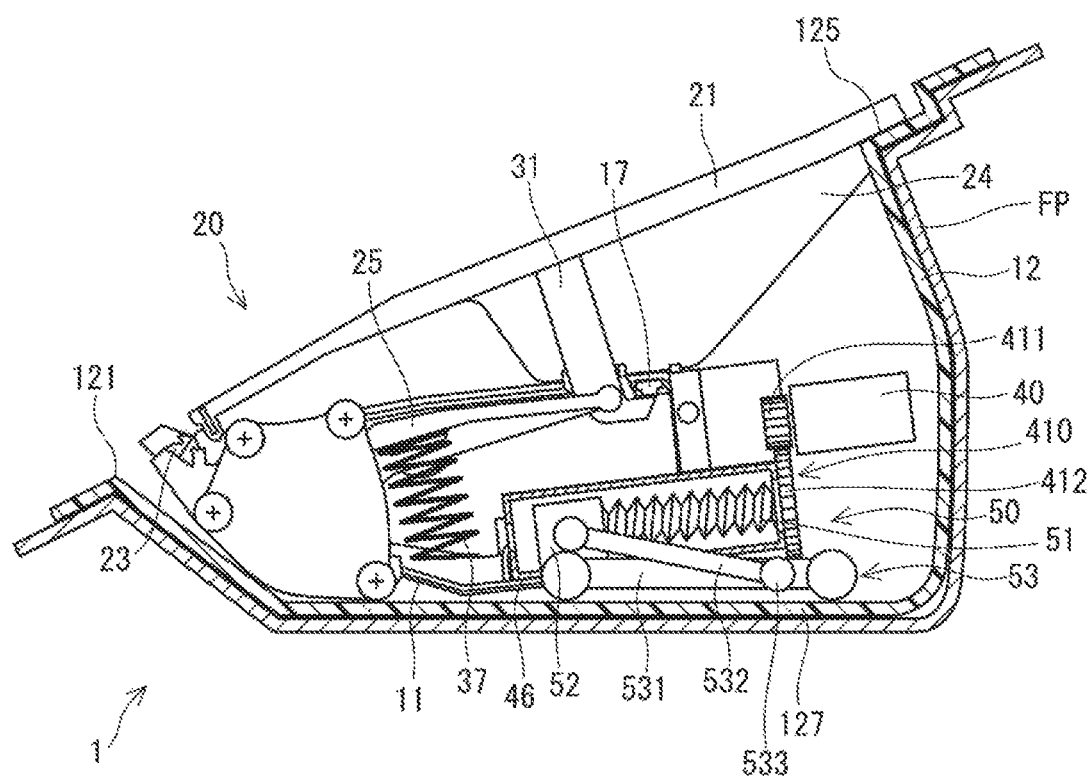
FIG. 6 is a side view showing an accelerator device in a retracted state according to the first embodiment.

As shown in FIG. 6, when the motor 40 is driven in the direction in which the female screw block 52 is separated from the gear mechanism 410 in the fully closed state of the accelerator, the link mechanism 53 is folded. As a result, the inner housing 11 and the pedal lever 20 and the like are integrally moved to a bottom wall 127 side of the outer housing 12. Further, the outer housing 12 is formed with a pad contact portion 125 that can come into contact with the pad 21. When the pad 21 comes into contact with the pad contact portion 125 of the outer housing 12 by driving the motor 40, the inner housing 11, the pedal lever 20, the motor 40, and the power transmission mechanism 50 are housed in the outer housing 12. In the present embodiment, the pad 21 comes into contact with the pad contact portion 125, so that the surface of the pad 21 becomes the same surface as the vehicle floor. It should be noted that "same surface" means that a step of about an assembly error is allowed. For example, by storing the accelerator device 1 during autonomous driving or the like, a large space under the driver's feet can be secured, so that comfort is improved.

As described above, the accelerator device 1 includes the inner housing 11, the pedal lever 20, the pedal urging member 37 as the urging member, and the motor 40 as the actuator. The inner housing 11 is supported to the outer housing 12 by the link mechanism 53 as a support member. The pedal lever 20 is rotatably supported to the inner housing 11 in response to the stepping operation. One end of the pedal urging member 37 abuts on the inner housing 11 and the other end thereof abuts on the pedal lever 20 to urge the pedal lever 20 in the closing direction. The motor 40 can drive the inner housing 11 in the opening direction and the closing direction of the pedal lever 20. With this configuration, the reaction force of the pedal lever 20 can be adjusted by driving the inner housing 11, and at least a part of the components can be stored in the outer housing 12 during autonomous driving or the like.

In the present embodiment, the reaction force can be adjusted by driving the inner housing 11 in the fully opening direction or the closing direction. Further, the inner housing 11 can be stored in the outer housing 12 by driving the inner housing 11 in a direction approaching the outer housing 12. Further, since the reaction force adjusting function and the storing function are realized by one motor 40, the configuration can be relatively simple and compact.

The accelerator device 1 includes the accelerator opening sensor 39 as a first sensor for detecting the stepping angle of the pedal lever 20, and the housing position sensor 49 as a second sensor for detecting the angle of the inner housing 11 with respect to the outer housing 12. The motor 40 is controlled based on the detection values of the accelerator opening sensor 39 and the housing position sensor 49. Thereby, the reaction force can be appropriately controlled. In particular, the reaction force can be appropriately controlled while the tread surface is maintained.

The motor 40 generates a rotational force, and the accelerator device 1 includes the power transmission mechanism 50 that converts the rotational force of the motor 40 in a linear motion direction and transmits the rotational force to the inner housing 11. Specifically, the power transmission mechanism 50 has the feed screw 51 and the female screw block 52 as a screw block. The feed screw 51 is driven by a motor 40 to form a male thread. The female screw block 52 is formed with a female thread that meshes with the feed screw 51. The support member corresponds to the link mechanism 53 connected to the female screw block 52, the inner housing 11, and the outer housing 12.

Since the inner housing 11 is moved by the engagement between the male thread and the female thread, the inner housing 11 does not move when the pedal lever 20 is stepped, and the inner housing 11 can be easily positioned. Further, the load on the motor 40 can be reduced.

Second Embodiment

A second embodiment is shown in FIGS. 7 to 10. Since the power transmission mechanism of the second embodiment and a third embodiment is different from that of the above embodiment, the power transmission mechanism will be mainly described. The power transmission mechanism 60 of the accelerator device 2 has a feed screw 61, a cylinder 62, a holder 63, and a roller 64. The feed screw 61 has a male thread and is rotationally driven by the motor 40 via a gear mechanism 410.

In the present embodiment, the gear mechanism 410 is provided on the pad 21 side, and the inner housing 11, the cylinder 62, and the motor 40 are arranged side by side in this order. The inner housing 11 and the cylinder 62 are integrally and movably provided by being driven by the motor 40. The cylinder 62 is formed in a substantially cylindrical shape, and a feed screw 61 is housed therein.

The holder 63 is formed in a substantially bottomed cylindrical shape, and a female screw portion 631 that meshes with the feed screw 61 is formed on the opening side. The holder 63 is provided so that the end on the opening side is housed in the cylinder 62, the bottom side protrudes from the cylinder 62, and the holder 63 can be moved in the axial direction of the cylinder 62 by the rotation of the feed screw 61.

A roller 64 is provided on the bottom of the holder 63. The roller 64 slidably abuts on the bottom wall 127 of the outer housing 12. A regulation wall 128 for restricting the movement of the roller 64 is formed in the inner housing 11. The holder 63 may be movable along the bottom wall 127 of the inner housing 11, and the roller 64 may be omitted if the bottom surface of the holder 63 is formed so as to be slidable on the bottom wall 127 of the outer housing 12.

Figure 7:
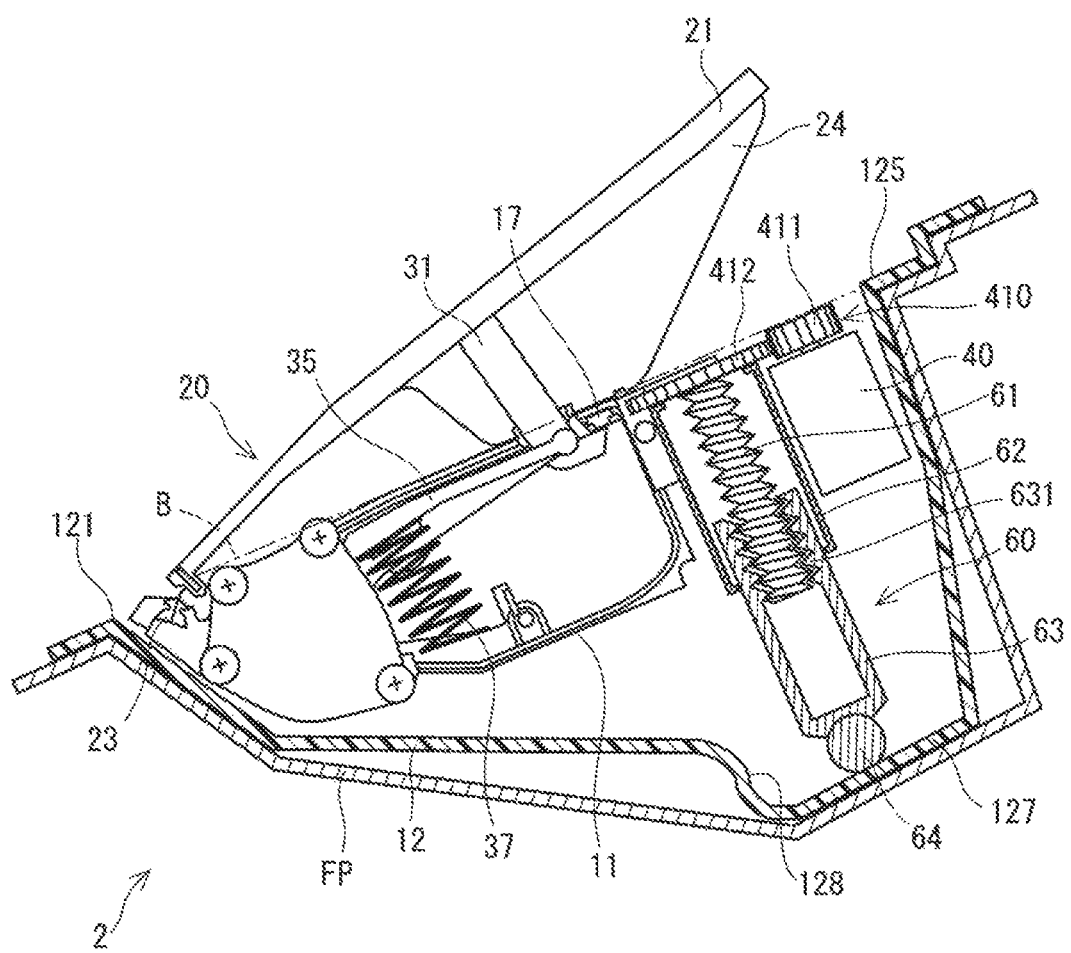
FIG. 7 is a side view showing an accelerator device according to a second embodiment.
Figure 8:
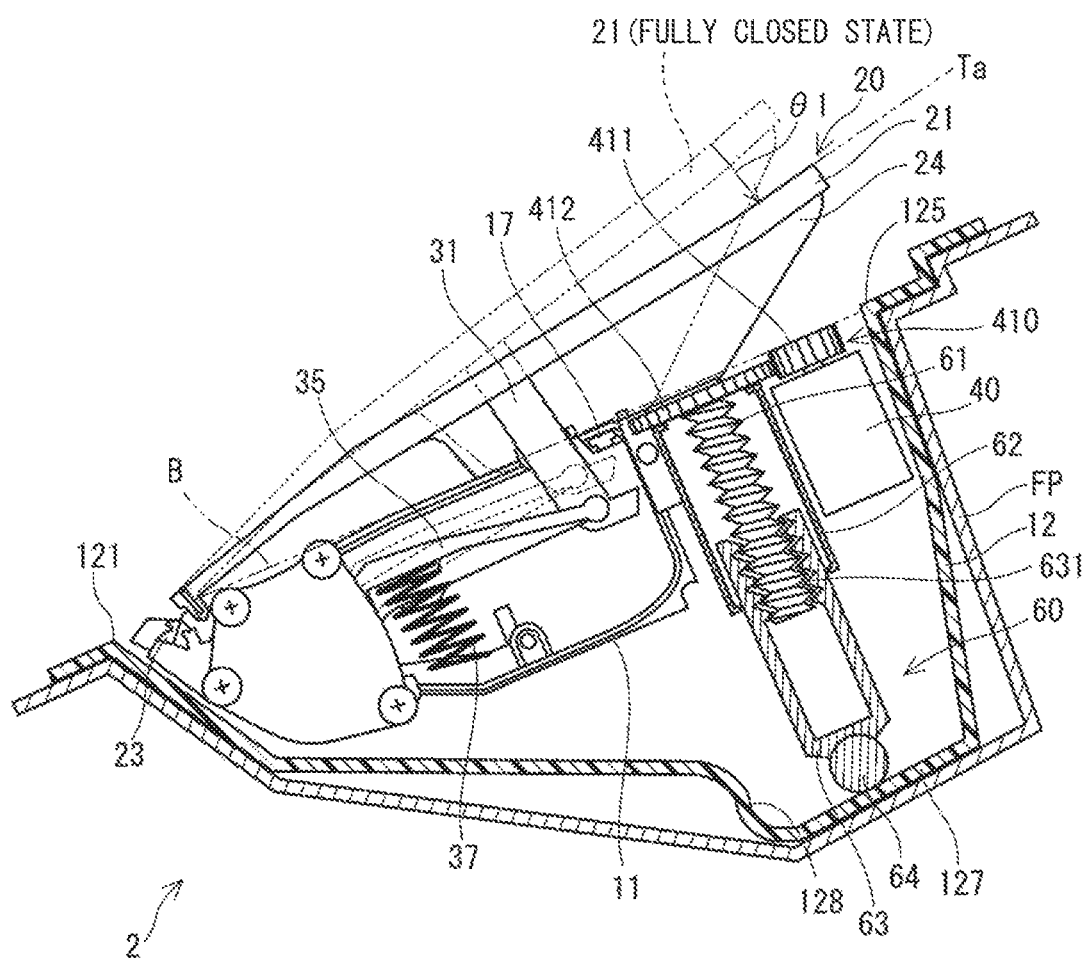
FIG. 8 is a side view showing an accelerator device in a state where a pedal lever is stepped according to a second embodiment.

FIG. 7 shows an initial state when the accelerator is fully closed. In the initial state, the holder 63 is located at an initial position that can be moved in both directions. As shown in FIG. 8, when the pedal lever 20 is stepped on without driving the inner housing 11, a reaction force corresponding to the pedal angle θ1 is applied by the urging force of the pedal urging member 37.

Figure 9:
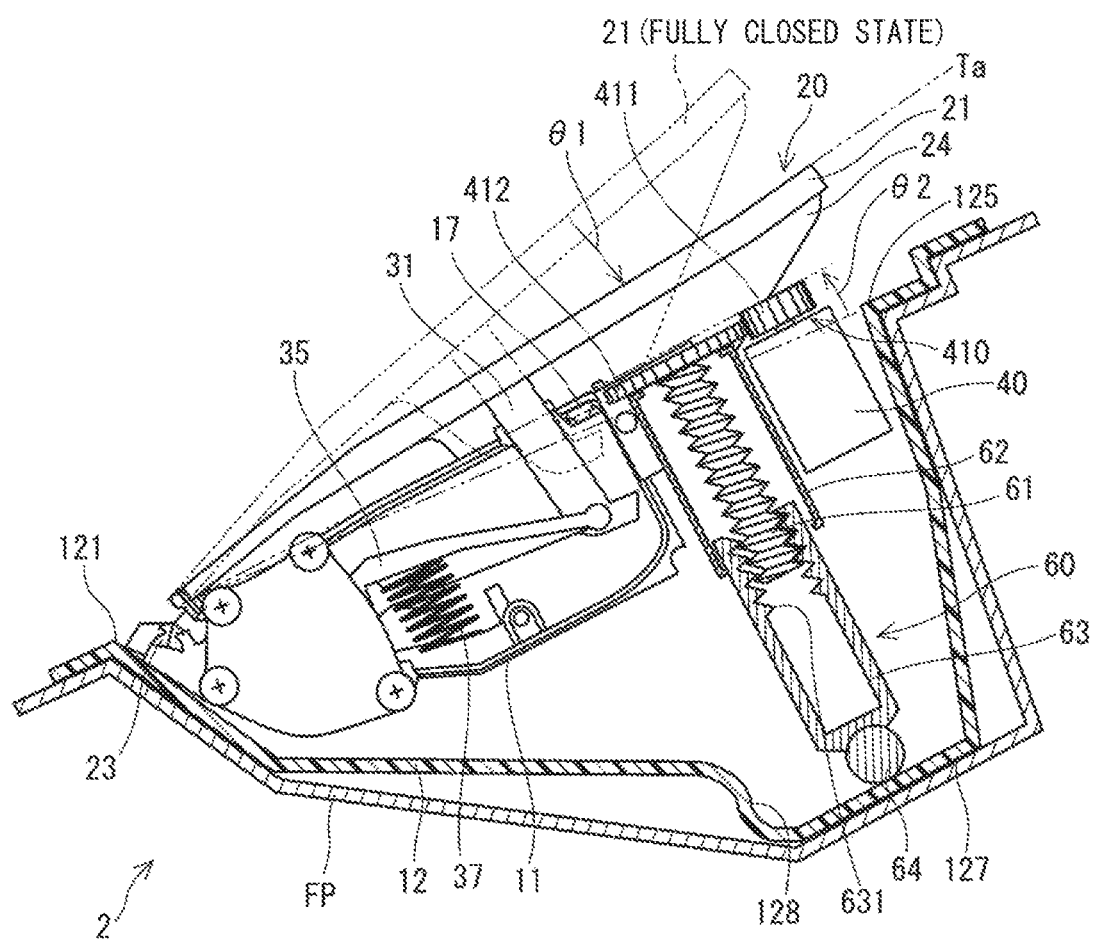
FIG. 9 is a side view showing an accelerator device in a state where an inner housing is driven according to the second embodiment.

As shown in FIG. 9, when the motor 40 is driven and the holder 63 is moved to a tip end side of the feed screw 61 while the tread surface position Ta is maintained, the inner housing 11 is driven to the side closer to the pad 21. As a result, the reaction force can be adjusted according to the housing angle θ2 while maintaining the tread surface position Ta.

Figure 10:
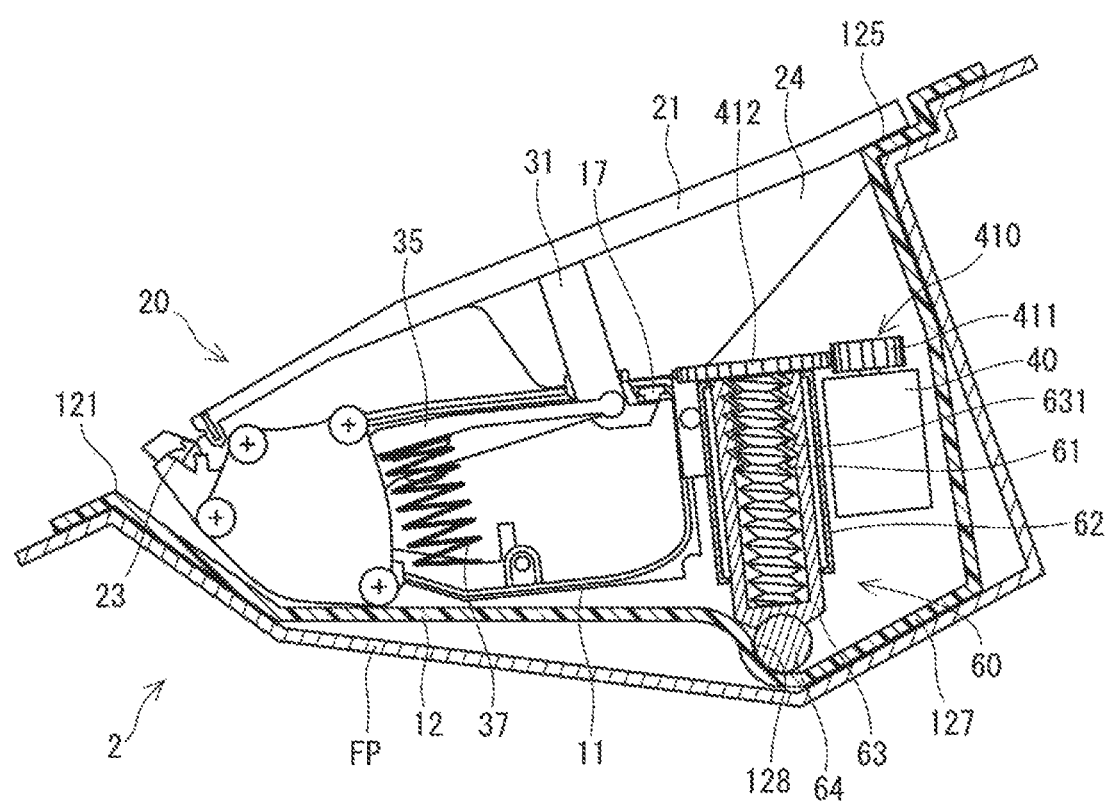
FIG. 10 is a side view showing an accelerator device in a retracted state according to the second embodiment.

As shown in FIG. 10, when the holder 63 is driven to a side accommodated in the cylinder 62 in the accelerator fully closed state, the inner housing 11 and the pedal lever 20 and the like are moved together to the bottom wall 127 side of the outer housing 12. When the pad 21 and the pad contact portion 125 of the outer housing 12 come into contact with each other, the inner housing 11, the pedal lever 20, the motor 40, and the power transmission mechanism 60 are housed in the outer housing 12.

In the present embodiment, the power transmission mechanism 60 has a feed screw 61 driven by the motor 40 to form the male thread, and the holder 63 in which the female thread that meshes with the feed screw 61 is formed and is slidably provided on the outer housing 12. In the present embodiment, the holder 63 corresponds to the support member. This configuration also achieves the same effects as those of the embodiment described above.

Third Embodiment

A third embodiment is shown in FIGS. 11 to 15. A power transmission mechanism 70 of the accelerator device 3 has a feed screw 71, a jack unit 72, and the like. The feed screw 71 has a male thread, and the thread is cut in the opposite direction from the center in the axial direction. The feed screw 71 is provided substantially parallel to the bottom wall of the inner housing 11. The feed screw 71 is rotationally driven by the motor 40 via the gear mechanism 410.

The jack unit 72 has female screw blocks 721 and 722, an upper connecting portion 723, a lower connecting portion 724, and links 725 to 728. The female screw blocks 721 and 722 have female threads formed inside and mesh with the feed screw 71. In the present embodiment, the female screw block 721 is located on a side farther from the gear mechanism 410 than the center of the feed screw 71, and the female screw block 722 is located on a side closer to the gear mechanism 410 than the center of the feed screw 71.

The upper connecting portion 723 is fixed to the inner housing 11. The lower connecting portion 724 is fixed to the outer housing 12. The female screw blocks 721 and 722 are connected by the link 725, the upper connecting portion 723, and the link 726 on the inner housing 11 side of the feed screw 71. Further, the female screw blocks 721 and 722 are connected by the link 727, the lower connecting portion 724, and the link 728 on the outer housing 12 side of the feed screw 71.

Figure 11:
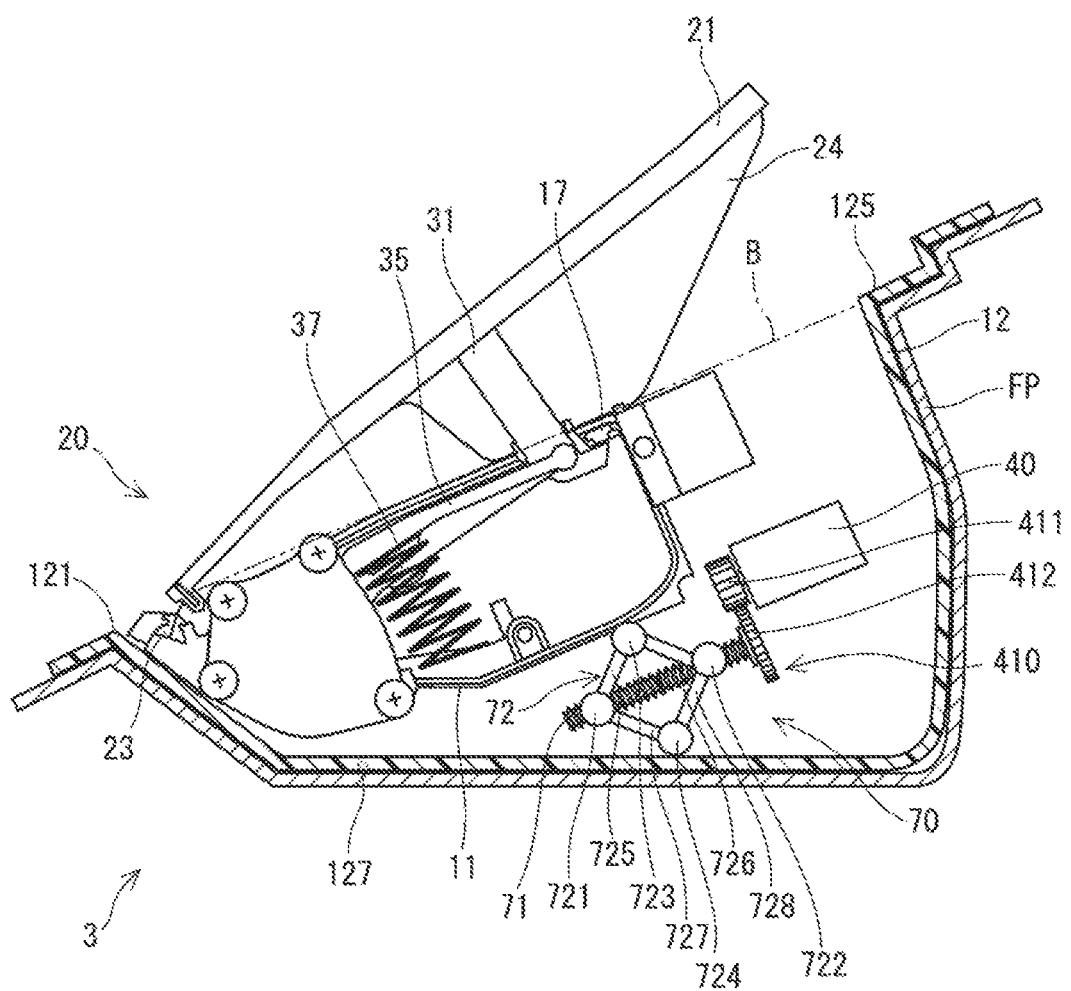
FIG. 11 is a side view showing an accelerator device according to a third embodiment.
Figure 12:
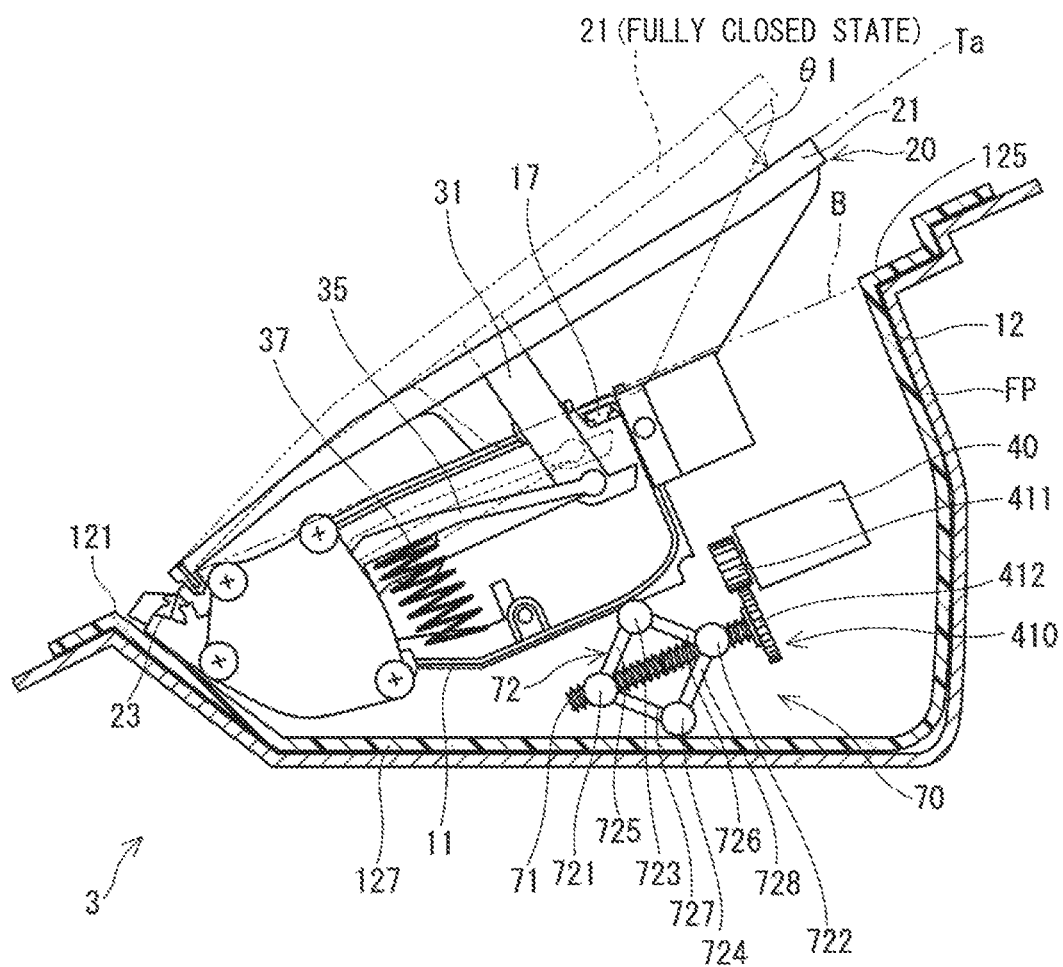
FIG. 12 is a side view showing an accelerator device in a state where the pedal lever is stepped according to the third embodiment.

FIG. 11 shows an initial state when the accelerator is fully closed. In the initial state, the female screw blocks 721 and 722 are located at the initial positions that can be moved in both directions. As shown in FIG. 12, when the pedal lever 20 is stepped on without driving the inner housing 11, a reaction force corresponding to the pedal angle θ1 is applied by the urging force of the pedal urging member 37.

Figure 13:
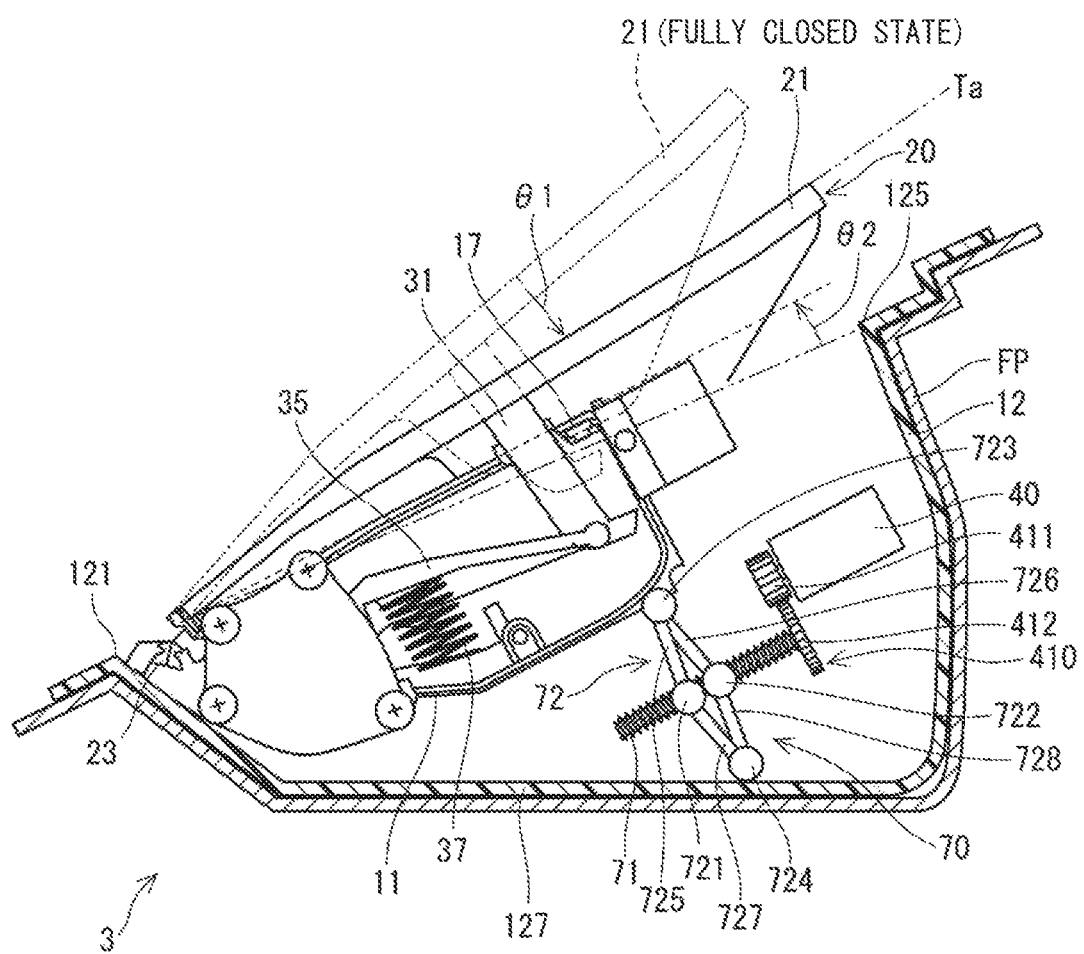
FIG. 13 is a side view showing an accelerator device in a state where the inner housing is driven according to the third embodiment.

As shown in FIG. 13, when the motor 40 is driven and the female screw blocks 721 and 722 are moved closer to the center while the tread surface position Ta is maintained, the inner housing 11 is driven to the side closer to the pad 21 by the upper connecting portion 723. As a result, the reaction force can be adjusted according to the housing angle θ2 while maintaining the tread surface position Ta.

Figure 14:
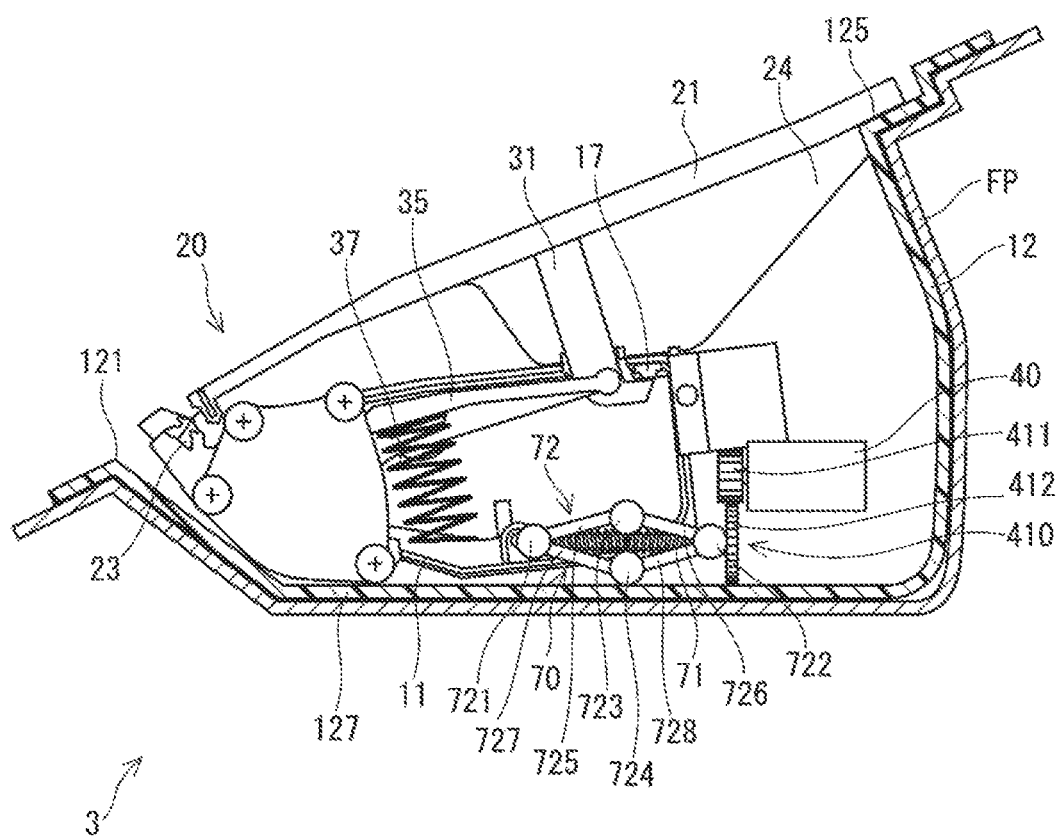
FIG. 14 is a side view showing an accelerator device in a retracted state according to the third embodiment.

As shown in FIG. 14, when the female screw blocks 721 and 722 are moved to the side away from the center of the feed screw 71 in the accelerator fully closed state, the jack unit 72 is folded, so that the inner housing 11 and the pedal lever 20 and the like move together to the bottom wall 127 side of the outer housing 12. When the pad 21 and the pad contact portion 125 of the outer housing 12 come into contact with each other, the inner housing 11, the pedal lever 20, the motor 40, and the power transmission mechanism 70 are housed in the outer housing 12.

The power transmission mechanism 70 of the present embodiment has the feed screw 71 and the jack unit 72 which is a support member. The feed screw 71 is driven by the motor 40, and is formed with a male thread whose thread direction is reversed at the intermediate portion. The jack unit 72 has female screw blocks 721 and 722 as screw blocks, and connecting portions 723 and 724. The female screw blocks 721 and 722 are provided on both sides of the middle portion of the feed screw 71, and have female thread that meshes with the feed screw 71. The connecting portions 723 and 724 connect the links 725 to 728 connected to the female screw blocks 721 and 722 with the feed screw 71 interposed therebetween. In the present embodiment, the inner housing 11 is fixed to the upper connecting portion 723 which is the connecting portion on one side of the feed screw 71, and the outer housing 12 is fixed to the lower connecting portion 724 which is the connecting portion on the other side. This configuration also achieves the same effects as those of the embodiment described above.

Other Embodiments

In the above embodiment, the actuator is a DC brushless motor. In another embodiment, the actuator may be a motor of a type other than the DC brushless motor, or an actuator other than the motor such as a solenoid may be used as the actuator. In the above embodiment, the accelerator device has been described as a floor-standing type (so-called "organ type"). In other embodiments, the accelerator device may be of a so-called hanging type (so-called "pendant type"). Further, the power transmission mechanism and the lock mechanism may be configured differently from the above-described embodiments. The present disclosure is not limited to the embodiment described above but various modifications may be made within the scope of the present disclosure.

The present disclosure has been described in accordance with embodiments. However, the present disclosure is not limited to this embodiment and structure. This disclosure also encompasses various modifications and variations within the scope of equivalents. Furthermore, various combination and formation, and other combination and formation including one, more than one or less than one element may be made in the present disclosure.

What is claimed is:

1. An accelerator device, comprising:
   an inner housing supported to an outer housing by a support member;
   a pedal lever configured to be rotatably supported by the inner housing in response to a stepping operation;
   an urging member configured to urge the pedal lever in a closing direction; and
   an actuator configured to drive the inner housing in an opening direction and the closing direction of the pedal lever.

2. The accelerator device according to claim 1, further comprising:
   a first sensor configured to detect a stepping angle of the pedal lever, and
   a second sensor configured to detect an angle of the inner housing with respect to the outer housing,
   wherein
   the actuator is controlled based on detection values of the first sensor and the second sensor.

3. The accelerator device according to claim 1, wherein the actuator generates a rotational force, and further comprising,
   a power transmission mechanism configured to convert a rotational force of the actuator in a linear motion direction and transmit it to the inner housing side.

4. The accelerator device according to claim 3, wherein the power transmission mechanism has a feed screw driven by the actuator to form one of a male thread or a female thread, and a screw block in which the other of the male thread or the female thread that meshes with the feed screw is formed, and
   the support member is a link mechanism connected to the screw block, the inner housing, and the outer housing.

5. The accelerator device according to claim 3, wherein the power transmission mechanism has a feed screw driven by the actuator to form one of a male thread or a female thread, and a holder which is a support member in which the other of a male thread or a female thread that meshes with the feed screw is formed and is slidably provided on the outer housing.

6. The accelerator device according to claim 3, wherein the power transmission mechanism has a feed screw, which is driven by the actuator and forms either a male thread or a female thread whose thread direction is reversed at an intermediate portion, and a jack unit which is a support member,
   the jack unit is connected to a screw block provided on both sides of the intermediate portion of the feed screw to form the other of a male thread or a female thread that meshes with the feed screw, and connecting portions that connect the links connected to the screw block on both sides with the feed screw interposed between them, and
   the inner housing is fixed to the connecting portion on one side of the feed screw, and the outer housing is fixed to the connecting portion on the other side.

* * * * *